US011118655B2

(12) United States Patent
Chih et al.

(10) Patent No.: US 11,118,655 B2
(45) Date of Patent: Sep. 14, 2021

(54) ASSEMBLING STRUCTURE FOR TIMELY AND SECURELY LOCKING AND RELEASING A ROPE

(71) Applicants: Ti-An Chih, Changhua Hsien (TW); Ti-Fan Shih, Changhua Hsien (TW)

(72) Inventors: Ti-An Chih, Changhua Hsien (TW); Ti-Fan Shih, Changhua Hsien (TW)

( * ) Notice: Subject to any disclaimer, the term of this patent is extended or adjusted under 35 U.S.C. 154(b) by 0 days.

(21) Appl. No.: 16/861,152

(22) Filed: Apr. 28, 2020

(65) Prior Publication Data

US 2020/0347911 A1 Nov. 5, 2020

(30) Foreign Application Priority Data

May 1, 2019 (TW) .................................. 108205388
May 1, 2019 (TW) .................................. 108205389

(51) Int. Cl.
*F16G 11/10* (2006.01)
*F16G 11/14* (2006.01)

(52) U.S. Cl.
CPC .......... *F16G 11/105* (2013.01); *F16G 11/146* (2013.01)

(58) Field of Classification Search
CPC . B66D 5/16; F16G 11/00; F16G 11/04; F16G 11/105; F16G 11/146
See application file for complete search history.

(56) References Cited

U.S. PATENT DOCUMENTS

| | | | | |
|---|---|---|---|---|
| 3,099,055 A | * | 7/1963 | Richard Huber John | ................... B61D 45/00 410/103 |
| 4,541,149 A | * | 9/1985 | Jensen | ..................... B63B 21/08 24/134 R |
| 4,580,658 A | * | 4/1986 | Brda | ......................... A62B 1/14 182/5 |
| 4,716,630 A | * | 1/1988 | Skyba | ................... F16G 11/106 24/134 KB |
| 4,878,270 A | * | 11/1989 | Westerkamp | ........... F16G 11/04 24/132 R |
| 5,271,127 A | * | 12/1993 | Christensen | .......... B60P 7/0823 24/16 R |
| 7,076,844 B2 | * | 7/2006 | Skyba | ................... F16G 11/106 24/134 R |
| 8,881,349 B2 | * | 11/2014 | Mulholland | .......... F16G 11/106 24/301 |
| 9,199,571 B2 | * | 12/2015 | Leung | .................... B60P 7/0823 |
| 10,035,028 B1 | * | 7/2018 | Siegel | ....................... A62B 1/06 |
| 10,092,781 B2 | * | 10/2018 | Malcolm | .................. A62B 1/14 |

(Continued)

*Primary Examiner* — Robert Sandy
*Assistant Examiner* — David M Upchurch
(74) *Attorney, Agent, or Firm* — Guice Patents PLLC (57) ABSTRACT

An assembling structure for timely and securely locking and releasing a rope includes a housing including two integral side walls for defining a space to allow a rope to pass through; a contact surface on an inner surface of the housing; a pivotal cam including an occlusion section and an engagement surface adapted to pivot about the contact surface from a first position to a second position and vice versa; a torsion spring on one pivot of the cam and having one end fastened in the cam and the other end passing through a limit member of the cam; and a pivotal trigger adapted to pivot about the housing from a third position to a fourth position and vice versa, the trigger including an occlusion member at one end in gear engagement with the occlusion section and a lever at the other end and extending out of the housing.

18 Claims, 10 Drawing Sheets

(56) References Cited

U.S. PATENT DOCUMENTS

| | | | | |
|---|---|---|---|---|
| 10,384,083 | B2* | 8/2019 | Bell | A62B 1/14 |
| 2005/0205852 | A1* | 9/2005 | Stone | B63B 21/08 |
| | | | | 254/216 |
| 2009/0188753 | A1* | 7/2009 | Liang | A63B 27/00 |
| | | | | 182/133 |
| 2012/0000043 | A1* | 1/2012 | Maire | B60P 7/0838 |
| | | | | 24/68 CD |
| 2013/0092480 | A1* | 4/2013 | Lavoie | B66D 5/16 |
| | | | | 188/65.1 |
| 2016/0228730 | A1* | 8/2016 | Chaumontet | A63B 29/02 |
| 2017/0113072 | A1* | 4/2017 | Sepe | A62B 1/14 |
| 2018/0340592 | A1* | 11/2018 | Truesdell | F16G 11/146 |
| 2019/0200710 | A1* | 7/2019 | Ben-Arie | A43C 11/14 |
| 2019/0376580 | A1* | 12/2019 | Oldiges | F16G 11/106 |

* cited by examiner

ASSEMBLING STRUCTURE FOR TIMELY AND SECURELY LOCKING AND RELEASING A ROPE

BACKGROUND OF THE INVENTION

1. Field of the Invention

The present invention relates to the technical field of an apparatus of grabbing a rope, and more particularly to an assembling structure for timely and securely locking and releasing a rope.

2. Description of Related Art

There are various different apparatuses used indoors, outdoors, trucks, camps, or yachts for grabbing a rope. For example, one of these apparatuses is a cam cleat that simply grabs a rope, and the other one is a clutch that allows a rope to be released while the rope is still holding a load. The cam cleat remains fixed and still (and cannot move immediately) and the rope is operated in a single direction to pull the rope tightly and thus the rope cannot be released regressively. The clutch also remains fixed and still (and cannot move immediately), and the rope is operated in a single direction to pull the rope tightly and thus the rope cannot be released regressively. In addition, the clutch has a handle, and the range of operating the handle is approximately equal to 180 degrees, so that the application is inconvenient.

Most apparatuses for lifting an object pass a rope to a fixed pulley or assemble the fixed pulley to a movable pulley in order to lift the object. Further, a structure for stopping the rope is installed for locking and releasing the rope immediately. As disclosed in U.S. Pat. No. 6,685,171, a pulley is installed, and when a rotable pawl and an engaging surface are used to lift the object, the rope can be locked immediately, and an arm extending outwardly from the rotable pawl to an appropriate length is provided, so that if a user swings the rope biasedly and applies a force to push the arm, the rope can be locked immediately when the object is descended, but when the object is descended (or the rope is released), the rotable pawl will approach the engaging surface. In other words, the rope will rob the pawl to produce an unsmooth operation during the process of releasing the rope. Further, products adopting the aforementioned patent are unable to release a hanged object having a weight less than 2.25 kg.

In a conventional auxiliary tool for locking a rope or fastening a tightened rope as disclosed in U.S. Pat. Nos. 7,428,769 and 8,141,212, a V-shaped groove is formed on an exterior side surface of a housing, and the inner wall of the V-shaped groove has a plurality of parallel oblique ridges. When a tensioned (tightened) rope is passed in and out of the housing, the exposed rope can be crammed into the V-shaped groove to achieve the effect of fastening the rope, and such structure is capable of tying a tightened rope quickly and easily, but it cannot tie a rope with a too large tension. Furthermore, after rope is fixed, the rope may sometimes slip out from the V-shaped groove. For example, a rope is used to tie goods in a truck by the aforementioned tool, and when the truck is traveling, the goods are shaken, so that the rope is loosened.

In addition to the lack of functions in the above-mentioned conventional products, these products are also not easy in the assembly process. The placement and fixation of each part will take considerable time and manpower.

SUMMARY OF THE INVENTION

It is therefore one object of the invention to provide an assembling structure for timely and securely locking and releasing a rope, the assembling structure being capable of being easily, quickly, and precisely assembled so that the manufacturing cost can be greatly decreased.

It is another object of the invention to provide an assembling structure for timely and securely locking and releasing a rope, the assembling structure being capable of smoothly, safely lifting and lowering a load.

It is yet another object of the invention to provide an assembling structure for timely and securely locking and releasing a rope, the assembling structure being capable of locking the held rope.

It is a further object of the invention to provide an assembling structure for timely and securely locking and releasing a rope, the assembling structure being capable of tightening the rope.

For achieving above and other objects, the invention provides an assembling structure for timely and securely locking and releasing a rope, comprising a housing including two integral side walls for defining a space, an input communicating with the space, and an output communicating with the space so as to permit the rope pass through the input, the space, and the output; a first member provided on an inner surface of each side wall and adjacent to the input, the first member including a first positioning element at an inner end; a second member provided on the inner surface of each side wall and adjacent to the first member, the second member including a second positioning element at an inner end; a contact surface provided on an inner surface of the housing; a cam including two pivot members on two sides respectively, the pivot members being adapted to slide in the first member to pivotally anchor in the first positioning elements when the cam is inserted into the housing to be adjacent or engage with the contact surface from the input, the cam further comprising an engagement surface on one surface and an occlusion section on the other opposite surface, the engagement surface being adapted to pivot about the contact surface from a first position to a second position and vice versa; a torsion spring provided on one pivot member and having one end fastened in the cam and the other end passing through a limit member of the cam to form as an anchoring member wherein the torsion spring is provided in the housing and the anchoring member is anchored in a snapping element on an edge of one side wall so that the engagement surface is adapted to move along the contact surface; and a trigger including two pivot elements on two sides respectively, the pivot elements being adapted to slide in the second member to anchor in the second positioning elements when the trigger is inserted into the housing from the input so as to assemble the trigger and the housing, the trigger being adapted to pivot about the housing from a third position to a fourth position and vice versa, the trigger further comprising an occlusion member at one end being in gear engagement with the occlusion section and a lever at the other end and extending out of the housing, and the trigger being adapted to pivot in a direction opposite to that of the cam; wherein in response to pushing the lever in a direction opposite to the contact surface to pivot the trigger at the third position with the engagement surface rotated away from the contact surface and the torsion spring energized until the engagement surface reaches at the first position, the rope is adapted to pass through a passageway between the engagement surface and the contact surface; and wherein in response to releasing the lever, the torsion spring releases energy to pivot the engagement surface toward the contact surface until the engagement surface reaches the second position, the trigger reaches the fourth position, and the rope is locked in the passageway between the engagement surface and the contact surface.

The above and other objects, features and advantages of the invention will become apparent from the following detailed description taken with the accompanying drawings.

DETAILED DESCRIPTION OF THE INVENTION

Referring to FIGS. 1 to 12, an assembling structure for timely and securely locking and releasing a rope in accordance with a first preferred embodiment of the invention comprises a housing 12, a contact surface 13, a cam 14, a torsion spring 15 and a trigger 16 as discussed in detail below.

The housing 12 includes two side walls 11 with a space defined between. Alternatively, the housing 12 includes two integral side walls 11. The housing 12 further comprises an input 22 and an output 24 for entering/retracting a rope 100 into/from the housing 12. A hook 26 is provided at an end of the housing 12 and can be used to attach to a wall, a ceiling, a pillar or the like. Alternatively, the housing 12 can be mounted on the wall, the ceiling, or the pillar if the hook 26 is not provided.

A first groove 111 is provided on an inner surface of each side wall 11. One end of the first groove 111 is corresponding to the input 22. A first hole 112 is provided at an inner end of the first groove 111. A second groove 113 is provided on the inner surface of each side wall 11 and adjacent to the first groove 111. A second hole 114 is provided at an inner end of the second groove 113.

The contact surface 13 is provided on an intermediate portion of an inner surface of one side wall 11 or formed integrally with the housing 12. The contact surface 13 is either a coarse surface or a smooth surface. Alternatively, the contact surface 13 is an occlusion surface (not shown) having increased friction in other embodiments.

The cam 14 includes two hollow, integral cylindrical members 141 on two sides respectively. The cylindrical members 141 are adapted to slide in the first groove 111 to anchor in the first holes 112 when the cam 14 is inserted into the housing 12 to be adjacent or engage with the contact surface 13 from the input 22 (see FIGS. 4 and 5). A pin 112' is inserted through the first holes 112 and the cylindrical members 141 to assemble the cam 14 and the housing 12. The cam 14 further comprises an engagement surface 42 on one surface and an occlusion section 44 on the other opposite surface. The engagement surface 42 can pivot about the contact surface 13 from a first position to a second position and vice versa. The engagement surface 42 is able to be partitioned correspondingly with the contact surface 13 and swings between the first position and the second position, and the occlusion section 44 is disposed at an end of the cam 14, wherein the cam 14 is pivotally coupled to two side walls 11 by using an eccentric pivotal connection method for producing different sized gaps between the contact surface 13 and the engagement surface 42. In other words, the cam 14 and the contact surface 13 form a cam cleat, and the engagement surface 42 is formed by at least one ratchet for providing better friction of the engagement surface 42 for retardation and stop, and the occlusion section 44 is formed by a plurality of convex teeth surrounding an outer side of the cam 14.

Figure 1:
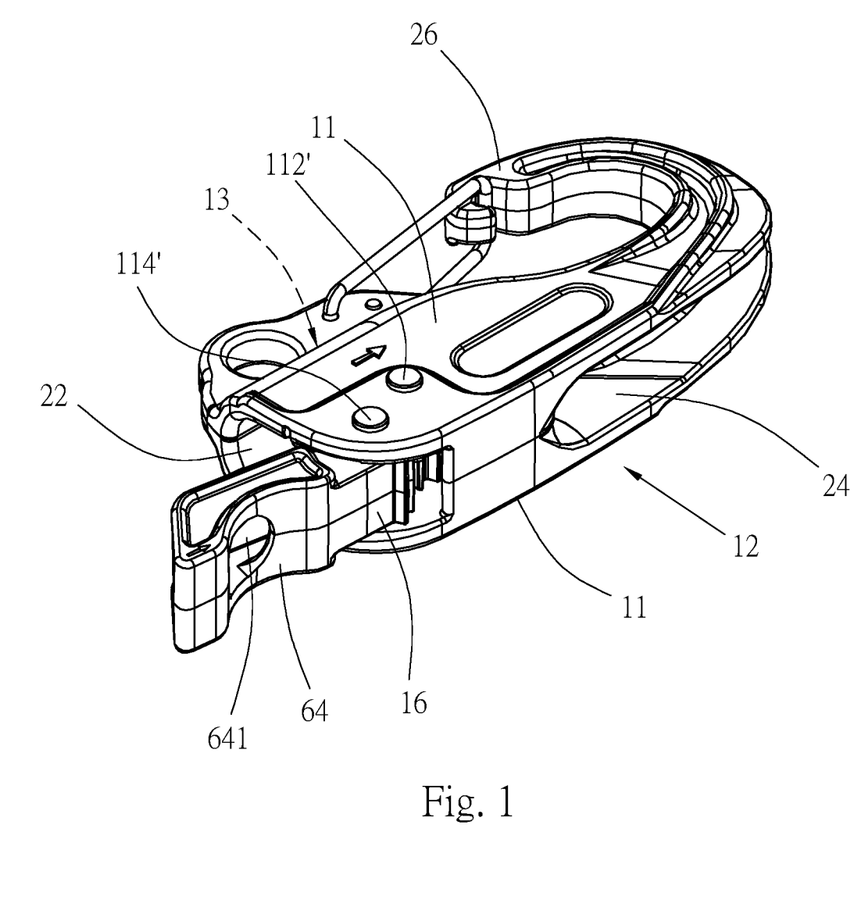
FIG. 1 is a perspective view of an assembling structure according to a first preferred embodiment of the invention.
Figure 2:
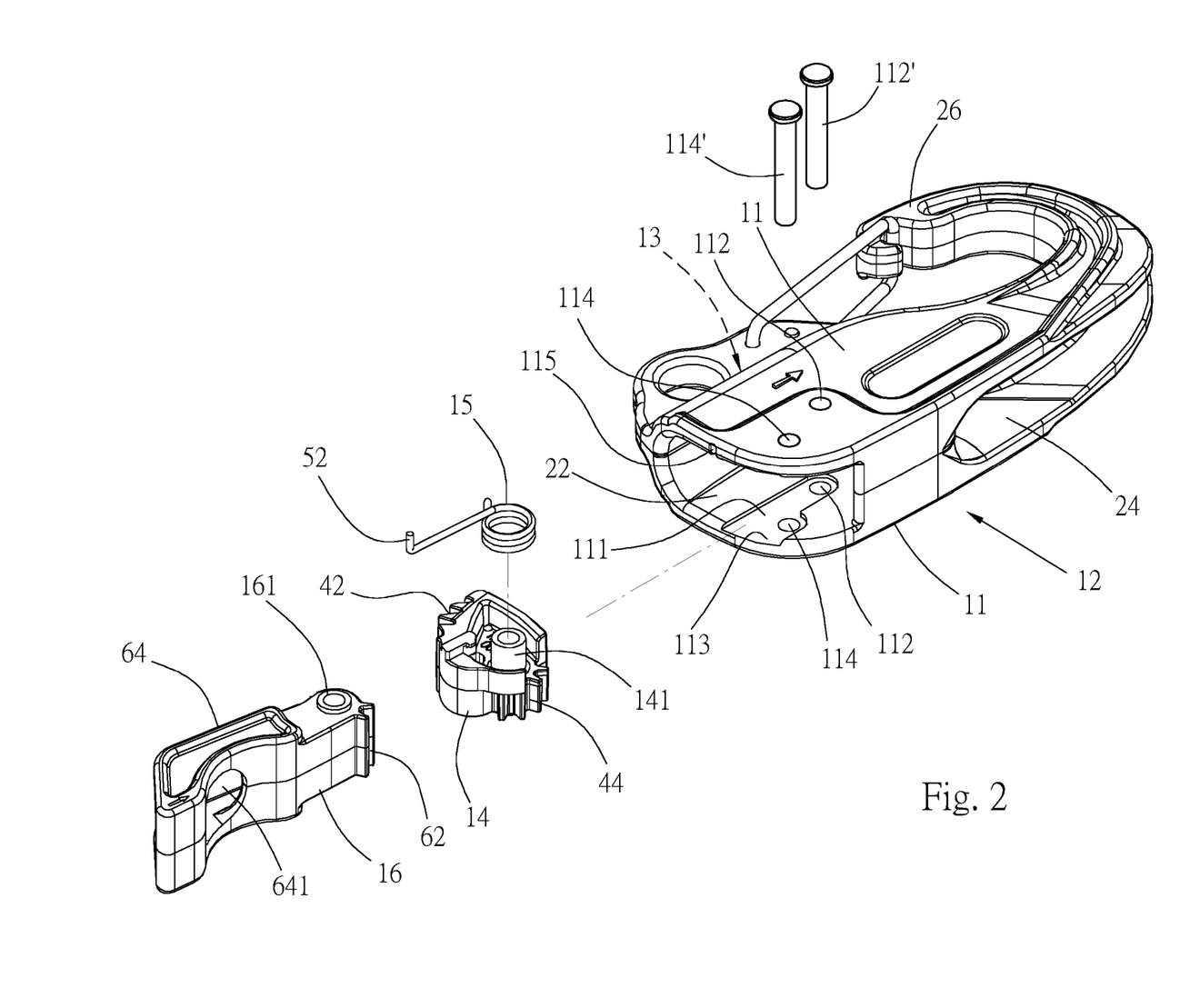
FIG. 2 is an exploded view of the assembling structure.
Figure 3:
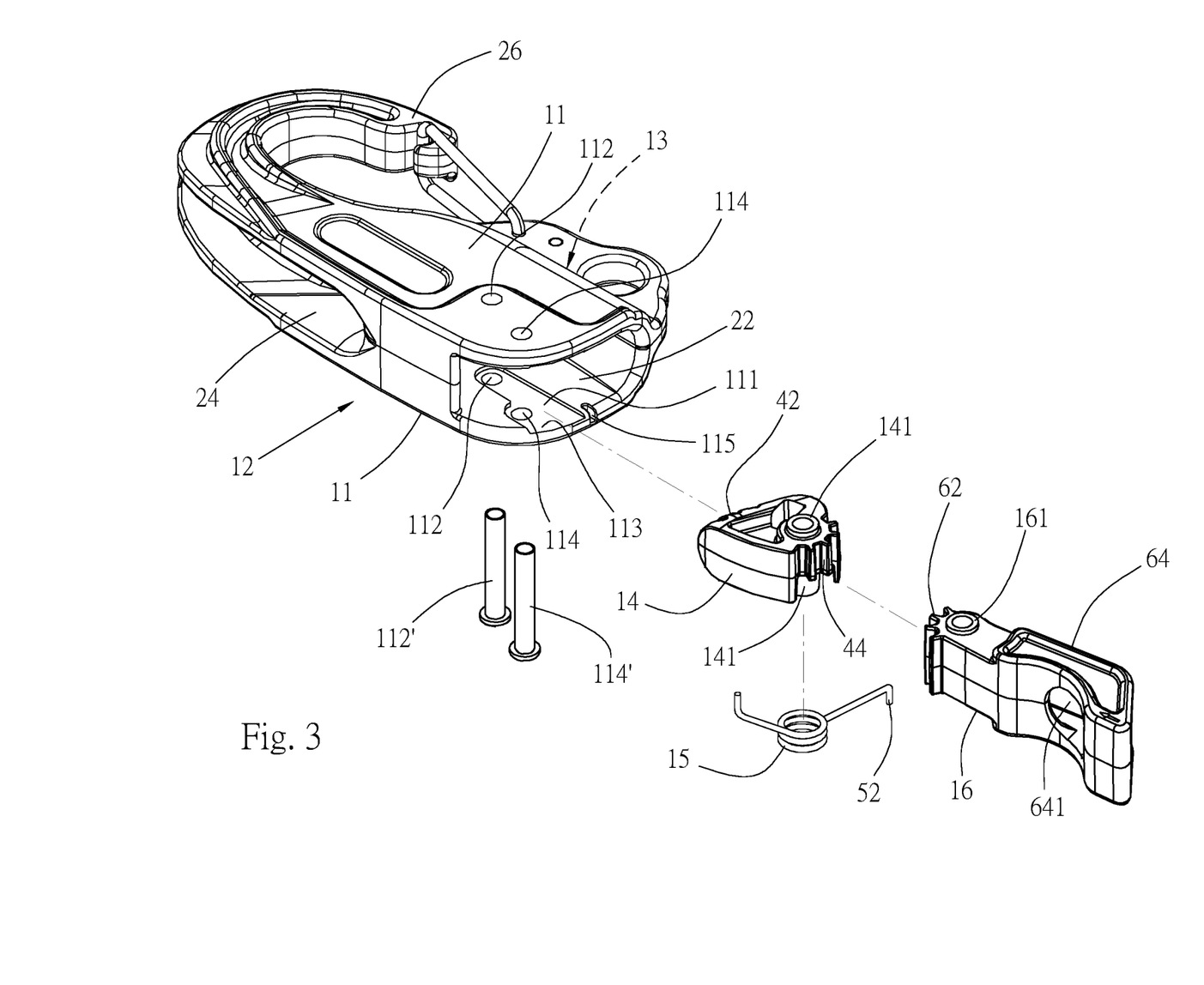
FIG. 3 is another exploded view of the assembling structure.
Figure 4:
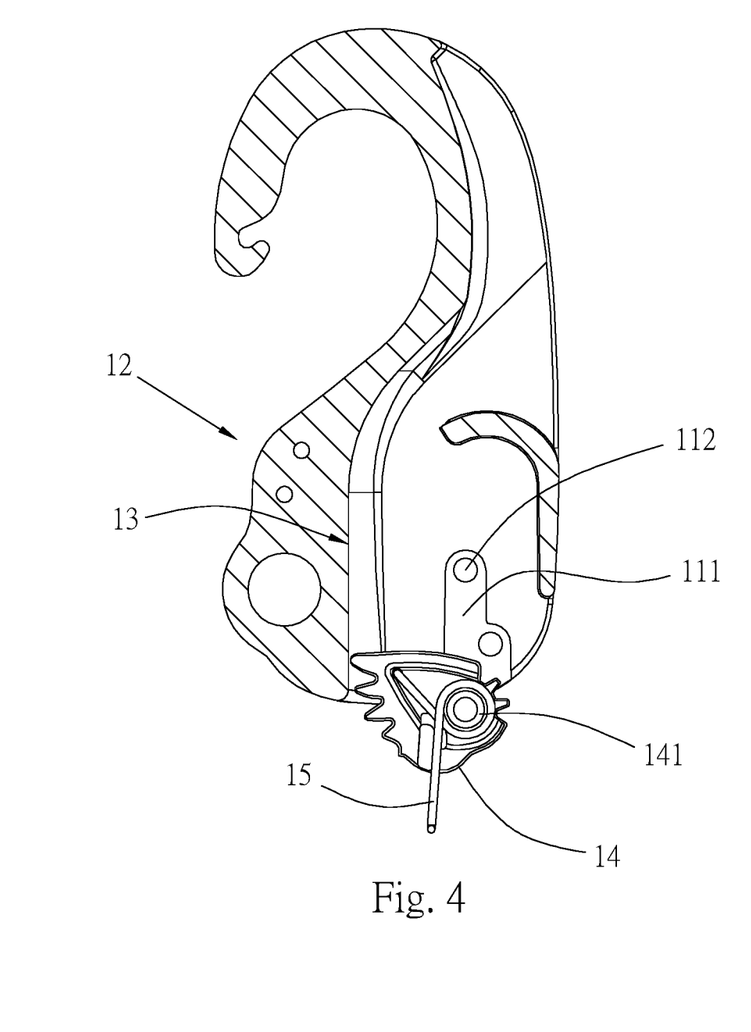
FIG. 4 is a longitudinal sectional view of the housing with the trigger removed and prior to assembling the cam.
Figure 5:
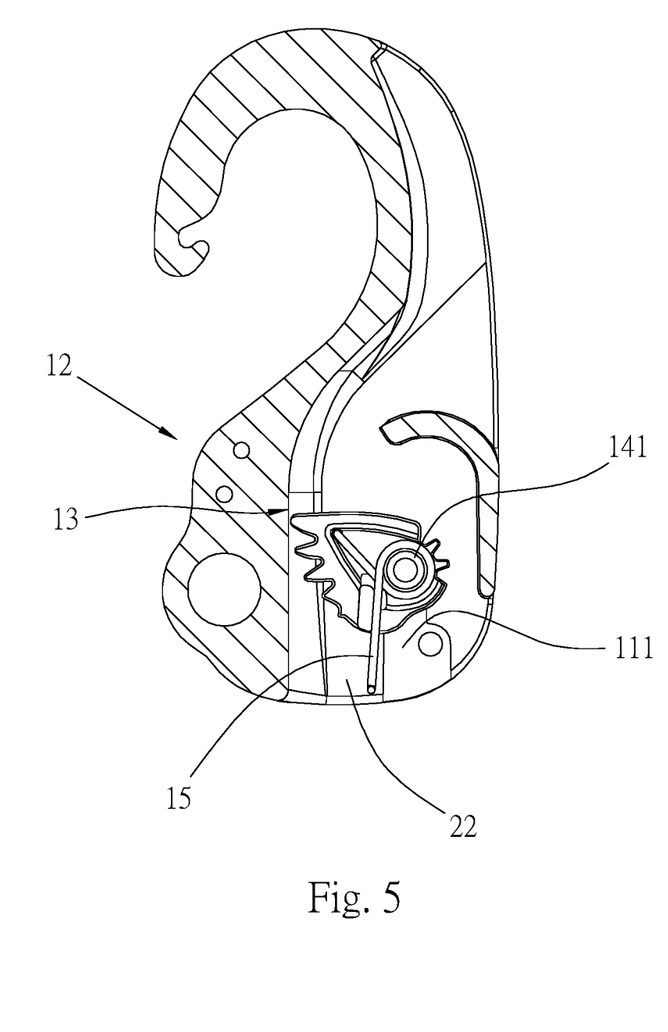
FIG. 5 is a view similar to FIG. 4 with the cam being assembled.
Figure 6:
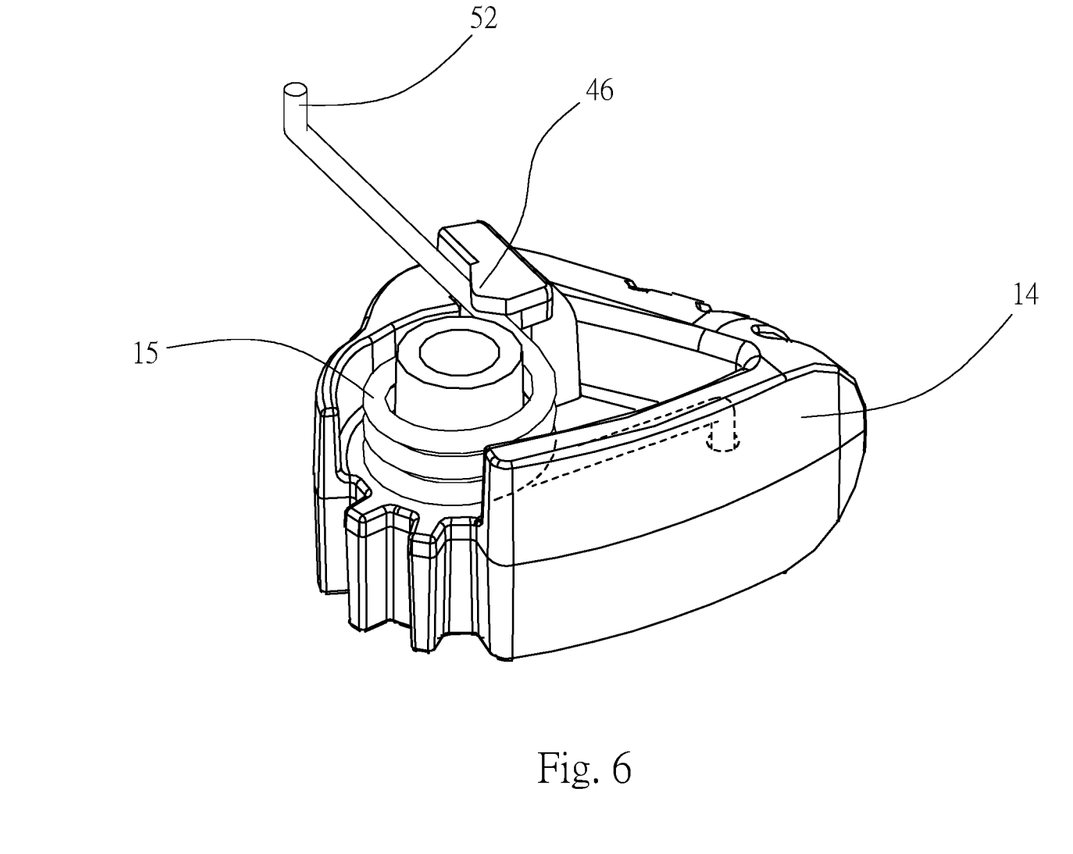
FIG. 6 is a perspective view of the assembled cam and the torsion spring.
Figure 7:
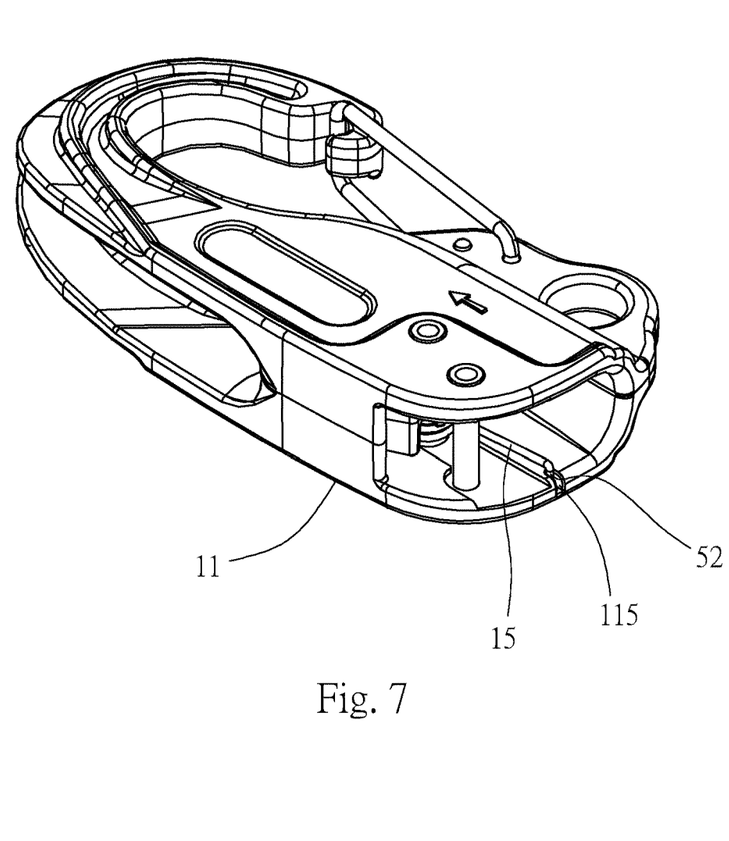
FIG. 7 is a perspective view of the housing showing the anchoring member of the torsion spring being fastened at an edge of the housing in a first configuration.
Figure 8:
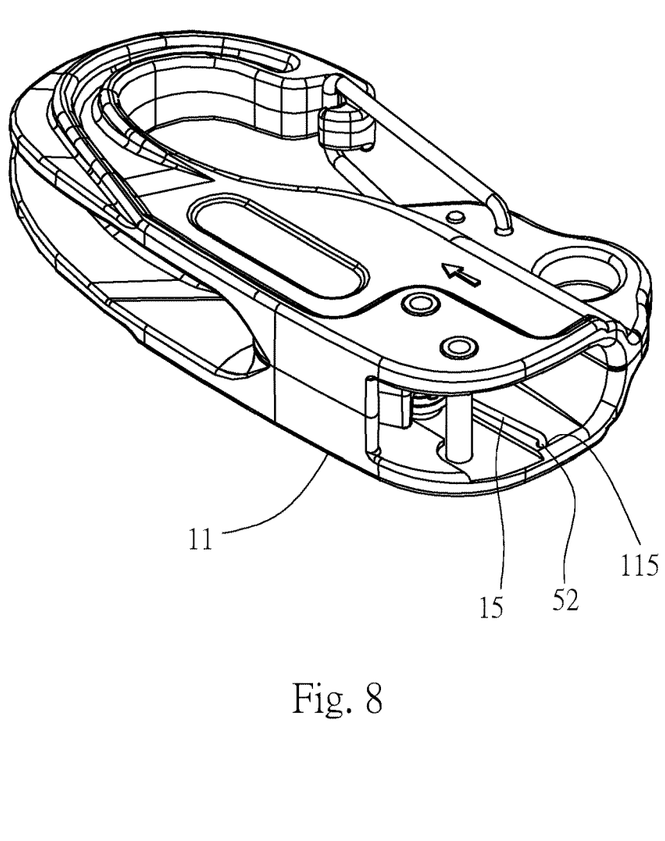
FIG. 8 is a perspective view of the housing showing the anchoring member of the torsion spring being fastened at an edge of the housing in a second configuration.
Figure 9:
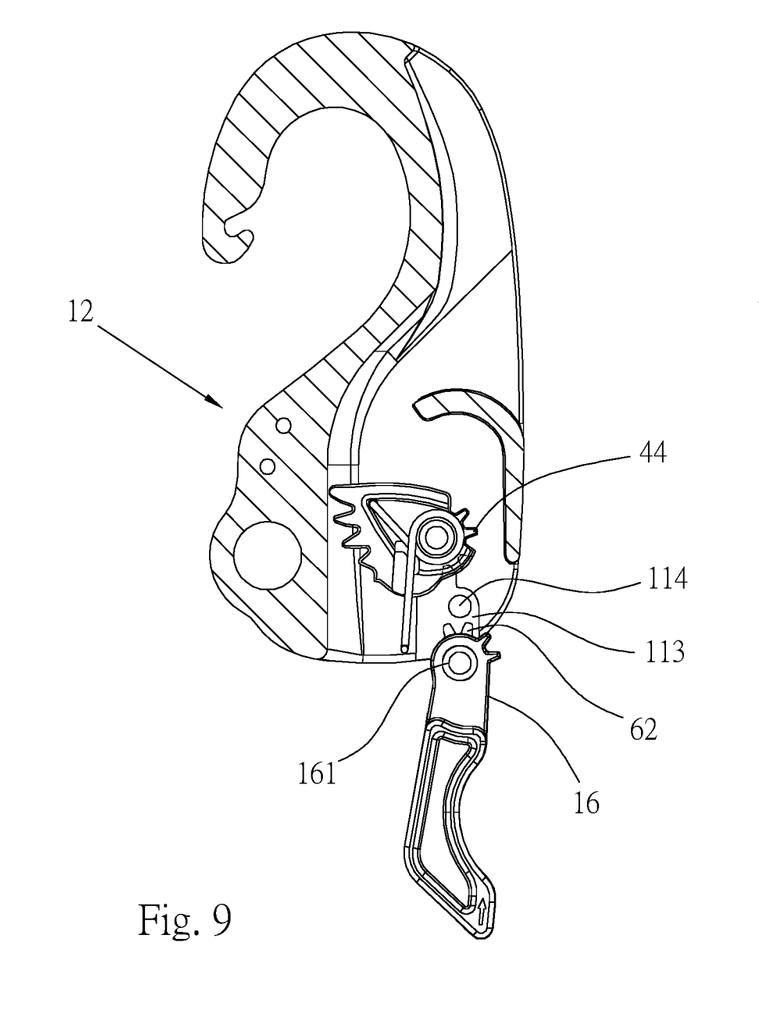
FIG. 9 is a longitudinal sectional view of the assembling structure prior to assembling the trigger.
Figure 10:
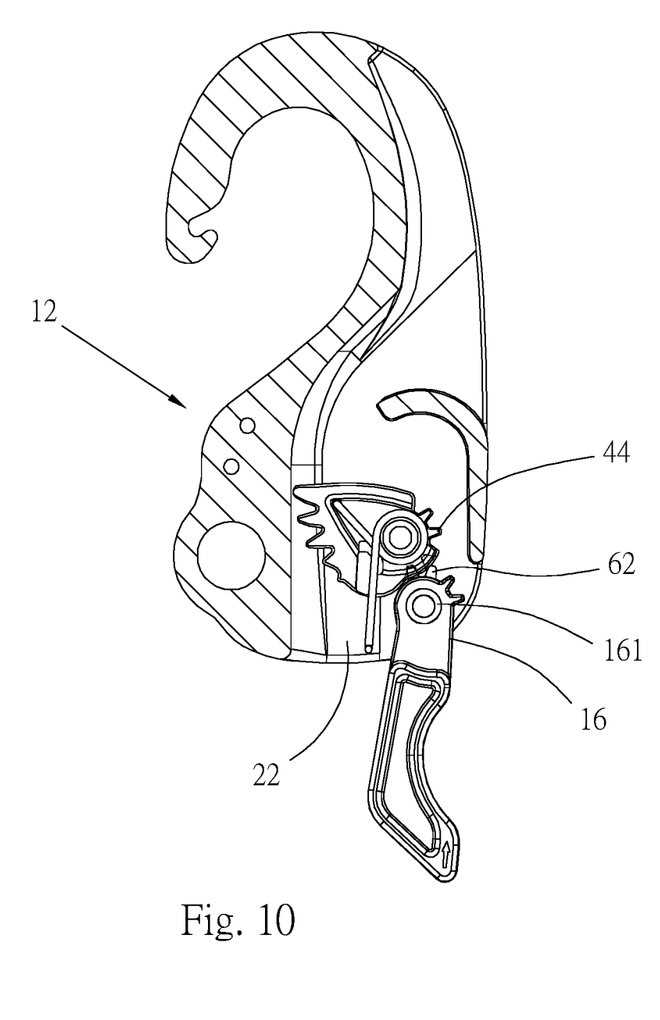
FIG. 10 is a view similar to FIG. 9 with the trigger being assembled.

The torsion spring 15 is provided on the cylindrical member 141 and has one end fastened in the cam 14 and the other end fitted or passed through a limit member 46 of the cam 14 such as a projecting block and extended to form as an anchoring member 52 (see FIG. 6). The torsion spring 15 is accompanied with the cam 14 while assembling the cam 14 into the housing 12. Then the anchoring member 52 is anchored in a cavity 115 on an edge of one side wall 11 of the housing 12. Thus, the engagement surface 42 may move along the contact surface 13 to fasten the rope 100 passing through the contact surface 13 and the engagement surface 42. Alternatively, the cavity 115 is replaced by a hole for anchoring the anchoring member 52 (i.e. the other end of the torsion spring 15) as shown in FIGS. 7 and 8.

The trigger 16 includes two hollow, integral cylindrical members 161 on two sides respectively. The cylindrical members 161 are adapted to slide in the second groove 113 to anchor in the second holes 114 when the trigger 16 is inserted into the housing 12 from the input 22 (see FIGS. 9 and 10). A pin 114' is inserted through the second holes 114 and the cylindrical members 161 to assemble the trigger 16 and the housing 12. The trigger 16 can pivot about the housing 12 from a third position to a fourth position and vice versa. The trigger 16 further comprises an occlusion member 62 at one end being in gear engagement with the occlusion section 44 and a lever 64 at the other end and extending out of the housing 12. Thus, the cam 14 pivots in a direction opposite to that of the trigger 16.

Figure 11:
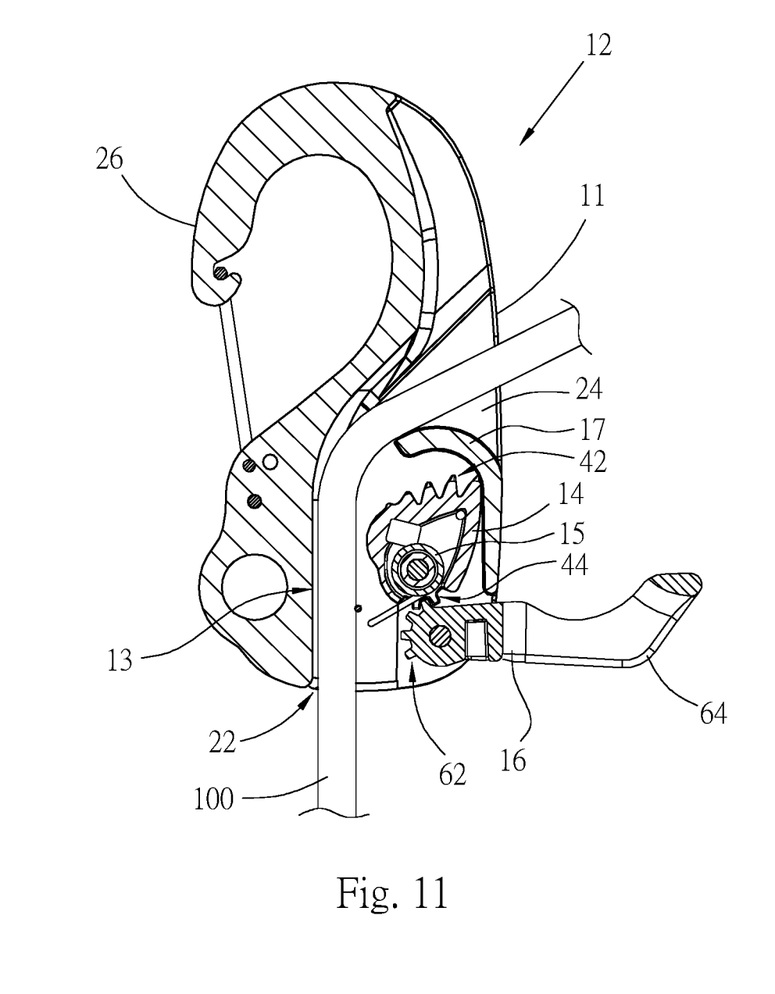
FIG. 11 is a longitudinal sectional view of the assembling structure showing the engagement surface at the first position, the trigger at the third position and the rope passing through the housing.
Figure 12:
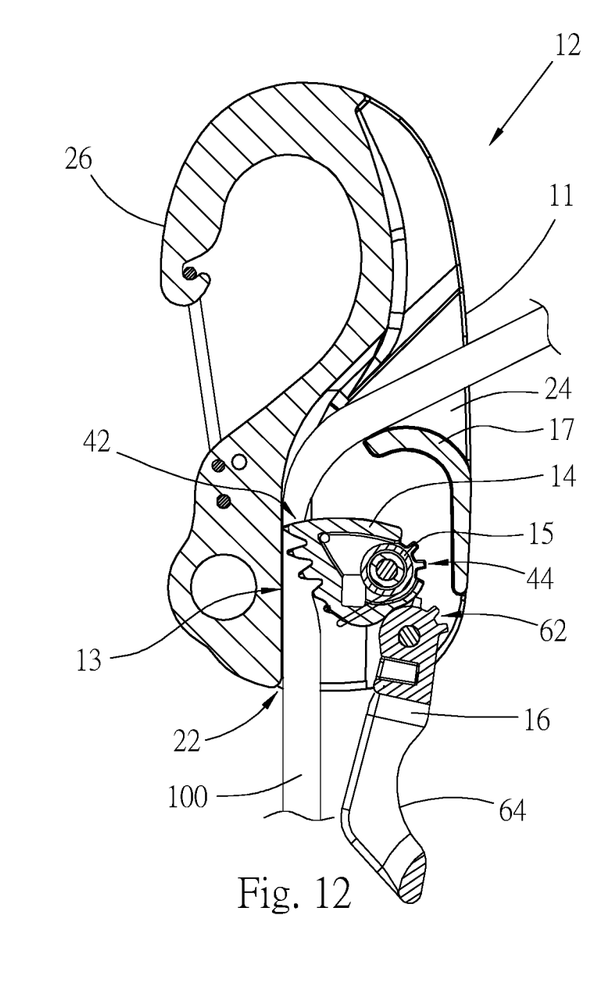
FIG. 12 is a view similar to FIG. 11 showing the engagement surface at the second position and the trigger at the fourth position.

Operation of the cam 14 and the trigger 16 is described in detail below. As shown in FIG. 11, a user may use one hand to push the lever in a direction opposite to the contact surface to pivot the trigger at the third position with the engagement surface rotated away from the contact surface and the torsion spring 15 energized until the engagement surface 42 reaches at the first position. A passageway is thus formed between the engagement surface 42 and the contact surface 13 so that the rope 100 may freely pass through the passageway. As shown in FIG. 12, as a continuation of the operation discussed above, the user may release the lever 64 and the energized torsion spring 15 releases energy to pivot the engagement surface 42 toward the contact surface 13 until the engagement surface 42 reaches the second position and the trigger 16 reaches the fourth position. As a result, the rope 100 is clamped at the passageway. In case the engagement surface 42 has a curved ratchet or oblique ratchet (as shown FIGS. 11 and 12), the rope 100 is allowed to move only in a direction toward the output 24. In the embodiment, one end of the rope 100 can timely secured for fastening a load on a truck or fixing a boat being fastened with the other end of the rope 100.

In the above embodiment, one user can let the rope 100 be entered/assembled the housing 12 by either the input 22 or the output 24 before using the invention.

Figure 13:
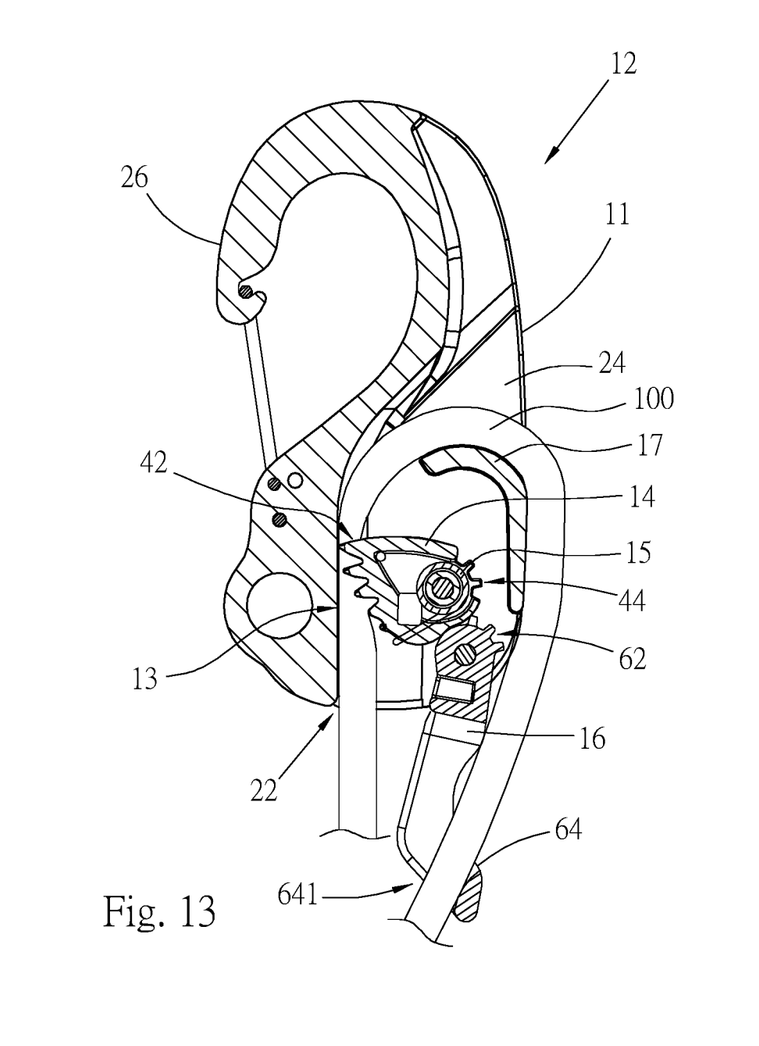
FIG. 13 is a view similar to FIG. 12 showing the rope passing through the aperture of the lever of the trigger with the rope being lockably engaged between the engagement surface and the contact surface.
Figure 14:
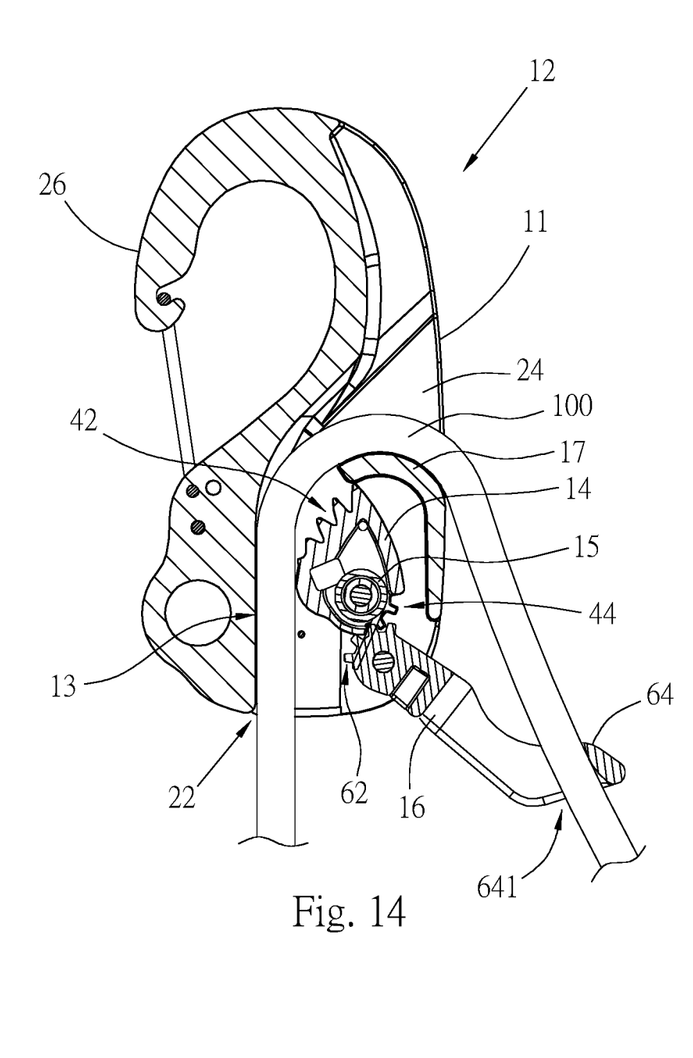
FIG. 14 is a view similar to FIG. 13 showing the lever being counterclockwise rotated to unfasten the rope.
Figure 15:
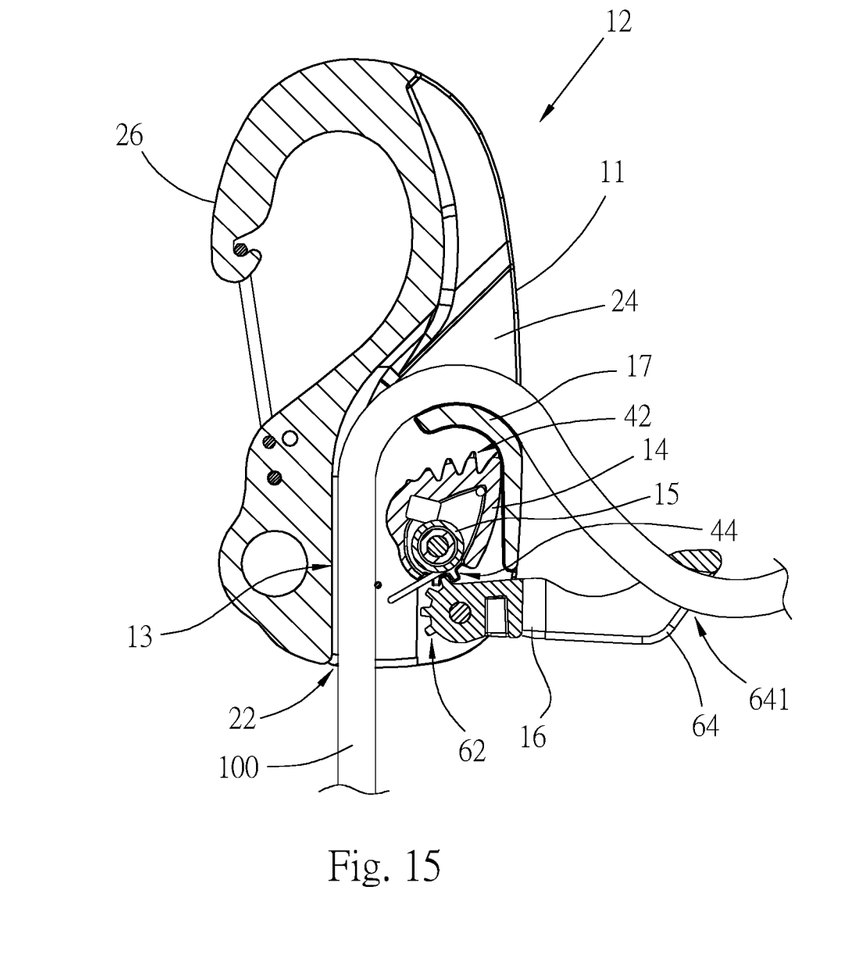
FIG. 15 is a view similar to FIG. 14 showing the lever being further counterclockwise rotated to allow the rope to freely pass through a passageway between the engagement surface and the contact surface, the engagement surface at the first position, and the trigger at the third position.

Referring to FIGS. 13 to 15, an assembling structure in accordance with a second preferred embodiment of the invention is shown. The assembling structure further comprises a seat (17) configured to be corresponsive to the other end of the cam (14) and installed to an inner side of one of the side walls 11.

In the embodiment as shown in FIG. 13, the rope 100 disposed at a side of the output 24 abuts against a side of the seat 17, and then the rope 100 is passed through a through an aperture 641 of the lever 64, so that the rope 100 can be bent inside the housing 12 and supported, and the rope 100 can be entered/retracted into/from the same side of the housing 12, and both ends of the rope 100 receive the external force from the same side. Such arrangement provides a better auxiliary tool for hanging and lifting a heavy object. Particularly, if the seat 17 is a pulley, the present invention will give a labor saving effect. In other words, if the assembling structure of the present invention is fixed to a high position and the other section of the rope 100 has a load (for example, an end of the rope 100 situated at the input 22 is connected with a heavy object), then we can apply a force downwardly to pass a section of the rope 100 through the aperture 641 of the lever 64 and then lift the heavy object safely. If we release the force or let the rope 100 go, the engagement surface 42 and the contact surface 13 will clamp the rope 100 immediately to prevent the heavy object from falling down or causing accidents.

The provision of the aperture 641 allows one user to remotely activate the trigger 16 by pulling one end of the rope 100, thereby pivoting the engagement surface 42. In the force applying method as shown in FIGS. 14 and 15, we can timely, easily and safely unload the heavy object. In other words, we can appropriately swing and apply a force to pass a section of the rope 100 through the aperture 641 of the lever 64 and simultaneously release the rope 100 to unload the heavy object. The clamping force between the engagement surface 42 and the contact surface 13 can be changed by the angle of swinging the trigger 16, so that the heavy object of the rope 100 can be released smoothly. Even if the rope 100 is not held properly, the engagement surface 42 and the contact surface 13 will clamp the rope 100 immediately to prevent the heavy object from falling down or causing accidents.

In the assembling structure of the present invention, the engagement surface 42 is formed by at least one oblique ratchet, so that the invention further provides an effect of clamping the rope 100 to slide in a single direction.

In the assembling structure of the present invention, the contact surface 13 is formed by at least one oblique ratchet (not shown in the figure), so that the invention further provides an effect of clamping the rope 100 to slide in a single direction.

The assembling structure for timely and securely locking and releasing a rope of the present invention has the following advantages:

By the design that the housing 12 is integrally formed to have the pair of first grooves 111, the pair of first holes 112, the pair of second grooves 113 and the pair of second holes 114, the design of the cylindrical members 141 on both sides of the cam 14, the design of the cylindrical members 161 on both sides of the trigger 16, and the design that the torsion spring 15 is housed in the cam 14, this creation can be easily, quickly and accurately combined to reduce costs.

The occlusion member 62 of the trigger 16 is engaged with of the occlusion section 44 of the cam 14 by the design of concave and convex teeth, so as to provide a better linkage effect.

The rope 100 with force applied thereto is exposed from the housing 12, so that the assembling of the rope 100 to the aperture 641 of the lever 64 is convenient.

The occlusion member 62 of the trigger 16 is engaged with the occlusion section 44 of the cam 14, and the seat 17 and the cam 14 are arranged at relative position as shown in FIGS. 11 and 15, and this design can prevent the rope 100 from contacting the engagement surface 42 effectively, so as to provide a more smooth operation of sliding or releasing the rope 100.

The figures of this invention disclose a design of the engagement surface 42 formed by a plurality of ratchets with increasing length from bottom to top or a plurality of ratchets with increasing extending outward from bottom to top, and this design can prevent the rope 100 from touching the engagement surface 42 effectively, so as to provide a more smooth operation of sliding or releasing the rope 100. In other words, the present invention still can effectively hang and release a heavy object with a weight approximately equal to 1.25 Kg.

While the invention has been described in terms of preferred embodiments, those skilled in the art will recognize that the invention can be practiced with modifications within the spirit and scope of the appended claims.

What is claimed is:

1. An assembling structure for timely and securely locking and releasing a rope, comprising:
   a housing having an interior space, and being formed of being selecting from a group consisting of any two corresponding side walls coupled with each other and two integrally formed side walls, an input communicating with the space, and an output communicating with the space so as to permit a flexible elongated element pass through the input, the space, and the output;
   a first member disposed on an inner surface of each side wall, one end of the first member being corresponding to the input, the first member including a first positioning element at an inner end of the first member;
a second member disposed on the inner surface of each side wall and adjacent to the first member, the second member including a second positioning element at an inner end of the second member;
a contact surface disposed on an inner surface of the housing;
a cam including two pivot members on two sides respectively, the pivot members being configured to slide in the first member to pivotally anchor in the first positioning elements when the cam is inserted into the housing to be corresponding to the contact surface from the input, the cam further comprising an engagement surface on one surface and an occlusion section on the other surface, the engagement surface being configured to pivot about the contact surface between a first position and a second position;
a torsion spring disposed on the cam and having one end fastened in the cam and the other end passing through a limit member of the cam to form as an anchoring member wherein the torsion spring is disposed in the housing and the anchoring member is anchored in a snapping element on an edge of one side wall so that the engagement surface is configured to move along the contact surface; and
a trigger including two pivot elements on two sides respectively, the pivot elements being configured to slide in the second member to anchor in the second positioning elements when the trigger is inserted into the housing from the input so as to assemble the trigger and the housing, the trigger being configured to pivot about the housing from a third position to a fourth position and vice versa, the trigger further comprising an occlusion member at one end being in engagement with the occlusion section and a lever at the other end and extending out of the housing, and the trigger being configured to pivot in a direction opposite to that of the cam;
wherein, the cam and the trigger are positioned as follows:
A. wherein in response to pushing the lever in a direction opposite to the contact surface to pivot the trigger at the third position with the engagement surface rotated away from the contact surface and the torsion spring energized until the engagement surface reaches at the first position, a passageway is thus formed between the engagement surface and the contact surface so that the flexible elongated element is configured to pass through the passageway; and
B. wherein in response to releasing the lever, the torsion spring releases energy to pivot the engagement surface toward the contact surface until the engagement surface reaches the second position, the trigger reaches the fourth position, and the flexible elongated element is clamped in the passageway between the engagement surface and the contact surface.

2. The assembling structure of claim 1, wherein each of the first and second members is a groove, the pivot members are communicating hollow cylinders, and the pivot elements are communicating hollow cylinders, and each of the first and second positioning elements is a hole for the receipt of the hollow cylinder, further comprising two pins respectively inserted through the hollow cylinders and the first positioning elements and the hollow cylinders and the second positioning elements.

3. The assembling structure of claim 1, wherein the limit member is a projecting member urging the torsion spring against the cam.

4. The assembling structure of claim 1, wherein the snapping element on the edge of one side wall is either a cavity or a hole for anchoring the anchoring member.

5. The assembling structure of claim 1, further comprising a seat on an inner surface of one side wall adjacent the output and facing the cam wherein the flexible elongated element engages an outer surface of the seat.

6. The assembling structure of claim 5, wherein the lever includes an aperture for allowing the flexible elongated element to pass through.

7. The assembling structure of claim 1, wherein at least one ratchet is form of being selected from a group consisting of the contact surface, the engagement surface, and a combination thereof.

8. The assembling structure of claim 5, wherein at least one ratchet is form of being selected from a group consisting of the contact surface, the engagement surface, and a combination thereof.

9. The assembling structure of claim 6, wherein at least one ratchet is form of being selected from a group consisting of the contact surface, the engagement surface, and a combination thereof.

10. The assembling structure of claim 1, wherein the cam is eccentrically pivotally mounted between the side walls.

11. The assembling structure of claim 5, wherein the cam is eccentrically pivotally mounted between the side walls.

12. The assembling structure of claim 6, wherein the cam is eccentrically pivotally mounted between the side walls.

13. The assembling structure of claim 1, wherein the occlusion section includes a plurality of teeth formed on an outer surface of the cam, and the occlusion member includes a plurality of teeth formed on an outer surface of the trigger.

14. The assembling structure of claim 5, wherein the occlusion section includes a plurality of teeth formed on an outer surface of the cam, and the occlusion member includes a plurality of teeth formed on an outer surface of the trigger.

15. The assembling structure of claim 6, wherein the occlusion section includes a plurality of teeth formed on an outer surface of the cam, and the occlusion member includes a plurality of teeth formed on an outer surface of the trigger.

16. The assembling structure of claim 1, wherein the flexible elongated element is configured to move through the passageway in one direction under the position of the engagement surface and the trigger are respectively at the second position and fourth position.

17. The assembling structure of claim 5, wherein the flexible elongated element is configured to move through the passageway in one direction under the position of the engagement surface and the trigger are respectively at the second position and fourth position.

18. The assembling structure of claim 6, wherein the flexible elongated element is configured to move through the passageway in one direction under the position of the engagement surface and the trigger are respectively at the second position and fourth position.

* * * * *